United States Patent
Cui et al.

(10) Patent No.: US 8,063,647 B2
(45) Date of Patent: Nov. 22, 2011

(54) TESTING APPARATUS FOR HARD DISK DRIVE

(75) Inventors: Zhen-Shan Cui, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 571 days.

(21) Appl. No.: 12/340,753

(22) Filed: Dec. 22, 2008

(65) Prior Publication Data

US 2010/0134118 A1   Jun. 3, 2010

(30) Foreign Application Priority Data

Nov. 28, 2008 (CN) .............................. 200810305859

(51) Int. Cl.
*H01H 31/02* (2006.01)
*G08B 21/00* (2006.01)

(52) U.S. Cl. ........................................ 324/556; 340/642

(58) Field of Classification Search .................. 324/555, 324/556; 340/641, 642
See application file for complete search history.

(56) References Cited

U.S. PATENT DOCUMENTS

| | | | |
|---|---|---|---|
| 4,019,128 A * | 4/1977 | Chebowski | 324/556 |
| 6,574,751 B1 * | 6/2003 | Lee | 714/21 |
| 6,910,157 B1 * | 6/2005 | Park et al. | 714/36 |
| 7,015,714 B2 * | 3/2006 | Pan et al. | 324/750.15 |

* cited by examiner

*Primary Examiner* — Timothy J Dole
(74) *Attorney, Agent, or Firm* — Altis Law Group, Inc.

(57) ABSTRACT

A testing apparatus includes a relay and a connector. The relay includes a coil, first and second single-pole double-throw (SPDT) switches. The first and the second SPDT switches include first and second contacts. The connector includes first and second hard disk drive (HDD) indicator pins, and first and second switch pins. The first contact of the first SPDT switch is grounded. The first contact of the second SPDT switch is connected to the power source. The first HDD indicator pin is connected to a power source. The second HDD indicator pin is connected to the second contact of the first SPDT switch and the second contact of the second SPDT switch. The first switch pin is connected to the power source. The second switch pin is grounded via the coil.

9 Claims, 3 Drawing Sheets

TESTING APPARATUS FOR HARD DISK DRIVE

BACKGROUND

1. Technical Field

The present disclosure relates to testing apparatuses and, particularly, to a testing apparatus for detecting a power indicator and a hard disk drive (HDD) indicator of a computer.

2. Description of Related Art

At present, states of power and an HDD of a personal computer can be revealed by indicators. The power and HDD indicators need to be tested when testing the computer. However, an ordinary testing apparatus is complicated, large, and inconvenient to use.

What is needed, therefore, is a testing apparatus which can solve the above problems.

DETAILED DESCRIPTION

Figure 1:
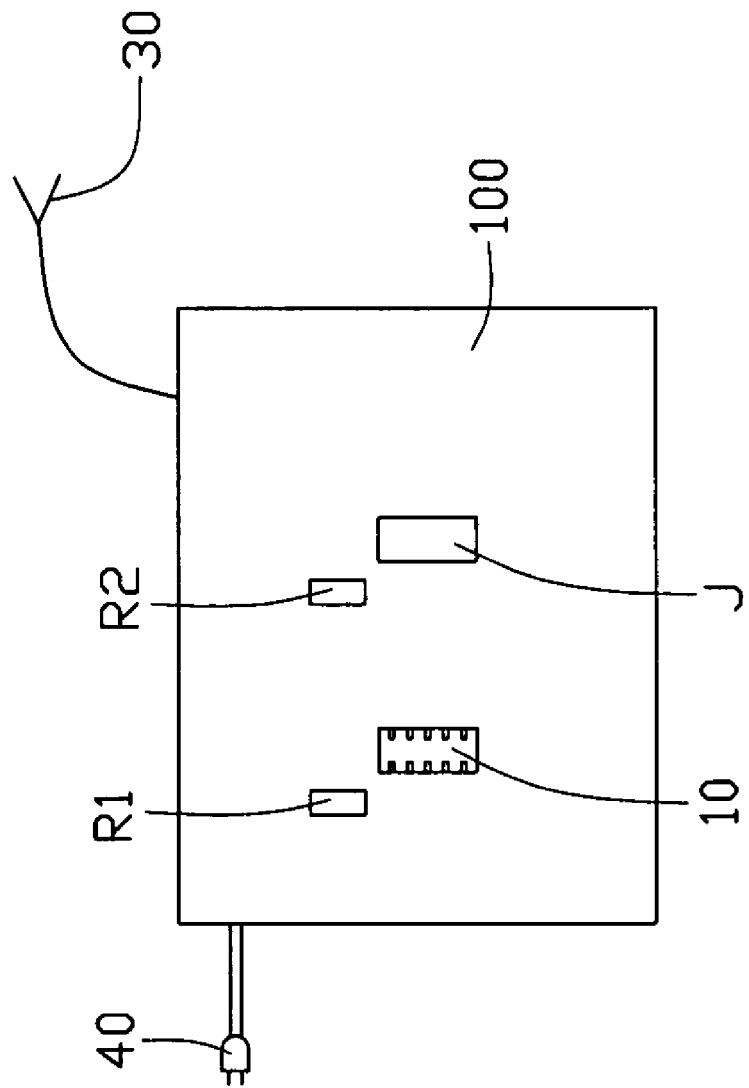
FIG. 1 is a schematic diagram of an embodiment of a testing apparatus.
Figure 2:
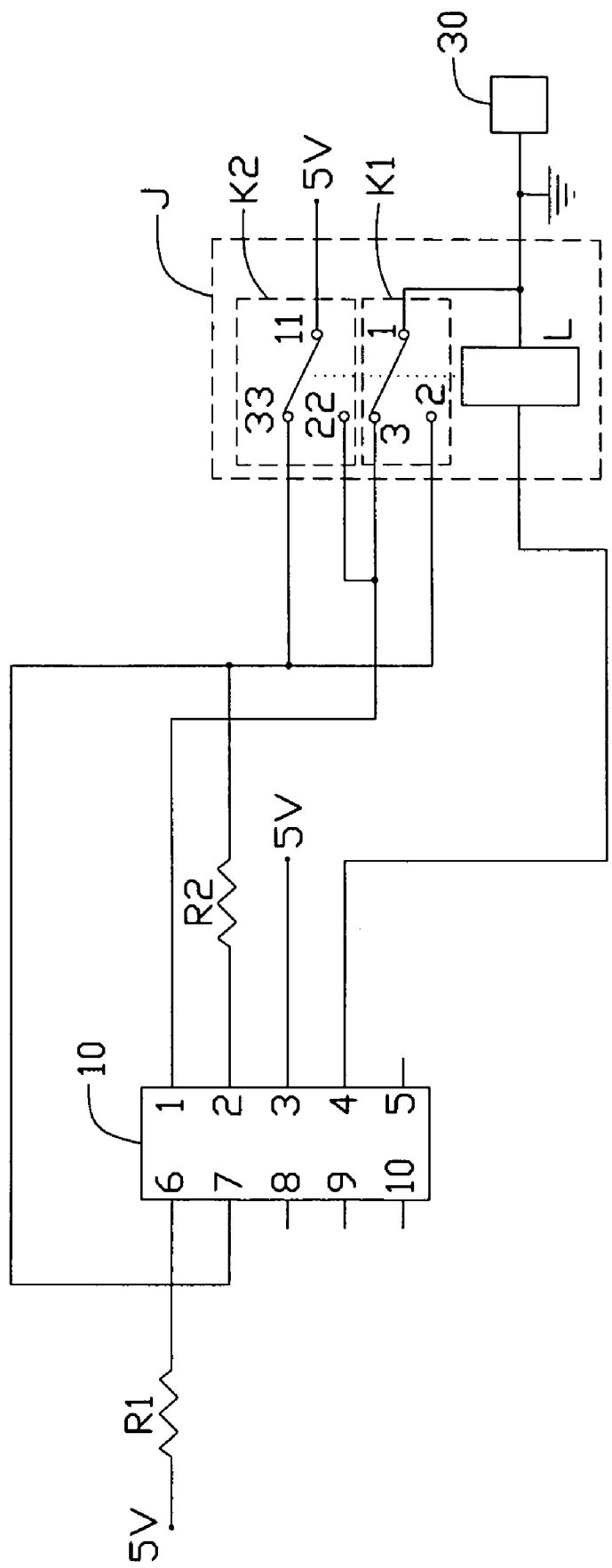
FIG. 2 is a circuit diagram of the testing apparatus of FIG. 1, according to an embodiment.

Referring to FIGS. 1 and 2, an exemplary embodiment of a testing apparatus includes a connector 10, two resistors R1 and R2, a relay J, and a ground clip 30. The relay J includes a coil L, and two single-pole double-throw (SPDT) switches K1 and K2. The SPDT switch K1 includes a first contact 1, a second contact 2, and a third contact 3. The SPDT switch K2 includes a first contact 11, a second contact 22, and a third contact 33. The ground clip 30 may have properties of resistance and capacitance, and is configured for clipping to an object. The connector 10, the resistors R1 and R2, and the relay J are set on a circuit board 100, and the ground clip 30 is electrically and mechanically connected to the circuit board 100 by a conductive member such as a wire or cable (not labeled).

A first HDD indicator pin 6 of the connector 10 is connected to a 5V power source via the resistor R1. A first power indicator pin 1 of the connector 10 is connected to the third contact 3 of the SPDT switch K1 and the second contact 22 of the SPDT switch K2. A second power indicator pin 2 of the connector 10 is connected to a second HDD indicator pin 7 of the connector 10, the second contact 2 of the SPDT switch K1, and the third contact 33 of the SPDT switch K2, via the resistor R2. A first switch pin 3 of the connector 10 is connected to the 5V power source. A second switch pin 4 of the connector 10 is grounded via the coil L. The first contact 1 of the SPDT switch K1 is grounded. The first contact 11 of the SPDT switch K2 is connected to the 5V power source. The ground clip 30 is grounded. The 5V power source can be gained by a power plug 40 connecting the testing apparatus to a 5V power source, or by a 5V battery group arranged in the testing apparatus. In one embodiment, the resistors R1 and R2 are used for limiting current, and can be deleted to save cost.

Figure 3:
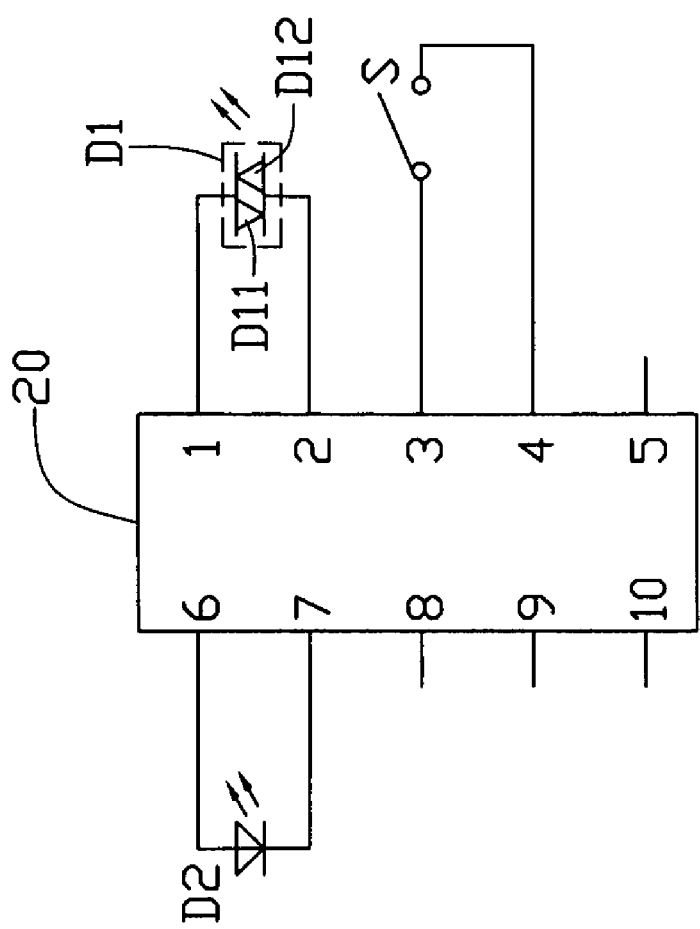
FIG. 3 is a partial circuit diagram of a computer to be tested, according to an embodiment.

Referring to FIG. 3, a computer to be tested includes an indicator connector 20, a bidirectional light emitting diode (LED) D1, an LED D2, and a power switch S. The bidirectional LED D1 includes two LEDs D11 and D12. In one embodiment, the bidirectional LED D1 is a power indicator of the host computer. The LED D2 is a HDD indicator of the host computer. The power switch S is a power switch of the computer. In this embodiment the LED D1 is yellow, the LED D12 is green, the LED D2 is red.

A pin 6 of the connector 20 is connected to the anode of the LED D2. The cathode of the LED D2 is connected to a pin 7 of the connector 20. The pin 1 of the connector 20 is connected to the anode of the LED D11 and the cathode of the LED D12. A pin 2 of the connector 20 is connected to the cathode of the LED D11 and the anode of the LED D12. A pin 3 of the connector 20 is connected to a pin 4 of the connector 20 via the power switch S.

During testing, the ground clip 30 is clipped to the case of the computer. The connector 20 is electrically connected to the connector 10. The power plug 40 is connected to the 5V power source. When the power switch S is closed, the second switch pin 4 of the connector 10 receives a high level signal, such as about 5V. A current passes through the coil L. The first contact 1 and the second contact 2 of the SPDT switch K1 are connected. The second HDD indicator pin 7 and the second power indicator pin 2 of the connector 10 receive a low level signal, such as about 0V. The first contact 11 and the second contact 22 of the SPDT switch K2 are connected. The first power indicator pin 1 of the connector 10 receives a high level signal, such as about 5V The LED D2 emits red light, the LED D11 emits yellow light, and the LED D12 remains unlit.

When the power switch S is opened, the second switch pin 4 of the connector 10 receives a low level signal, such as 0V. No current passes through the coil L. The first contact 1 and the third contact 3 of the SPDT switch K1 are connected. The first power indicator pin 1 of the connector 10 receives a low level signal, such as 0V. The first contact 11 and the third contact 33 of the SPDT switch K2 are connected. The second HDD indicator pin 7 and the second power indicator pin 2 of the connector 10 receive a high level signal, such as 5V The LEDs D2, D11 do not light. The LED D12 emits green light.

The power switch S controls the relay J to control the LEDs D1 and D2 to light or not to light, and to test the HDD indicator and the power indicator of the host computer. The testing apparatus contains a simple circuit, and is efficient for use in testing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A testing apparatus comprising:
   a relay comprising:
      a coil;
      a first single-pole double-throw (SPDT) switch comprising a grounded first contact and a second contact; and
      a second SPDT switch comprising a first contact connected to a power source and a second contact; and
   a connector comprising:
      a first hard disk drive (HDD) indicator pin connected to the power source;

a second HDD indicator pin connected to the second contact of the first SPDT switch and the second contact of the second SPDT switch;

a first switch pin connected to the power source; and a second switch pin grounded via the coil;

wherein in testing, the connector is electrically connected to an indicator connector of a host computer to be tested; upon the condition that a power switch of the host computer is closed, the second switch pin receives a high level signal, a current passes through the coil, the first contact and the second contact of the first SPDT switch are connected, the second HDD indicator pin receives a low level signal, an HDD indicator of the host computer lights up; upon the condition that the power switch is opened, the second switch pin receives a low level signal, no current passes through the coil, the first contact and the second contact of the second SPDT switch are connected, the second HDD indicator pin receives a high level signal, the HDD indicator does not light.

2. The testing apparatus of claim 1, wherein the connector further comprises a first power indicator pin and a second power indicator pin, the first SPDT switch further comprises a third contact, the second SPDT switch further comprises a third contact, the first power indicator pin is connected to the third contact of the first SPDT switch and the third contact of the second SPDT switch, the second power indicator pin is connected to the second contact of the first SPDT switch and the second contact of the second SPDT switch.

3. The testing apparatus of claim 2, further comprising a resistor, wherein the resistor is connected between the second power indicator pin and the second HDD indicator pin.

4. The testing apparatus of claim 1, further comprising a resistor, wherein the resistor connected between the first HDD indicator pin and the power source.

5. The testing apparatus of claim 1, further comprising a ground clip, wherein the ground clip is grounded, and configured for clipping to the host computer.

6. A testing apparatus comprising:
a relay comprising:
a coil,
a first single-pole double-throw (SPDT) switch comprises a grounded first contact, a second contact, and a third contact; and a second SPDT switch comprises a first contact connected to a power source, a second contact, and a third contact; and a connector comprising:
a first power indicator pin connected to the third contact of the first SPDT switch and the second contact of the second SPDT switch;

a second power indicator pin connected to the second contact of the first SPDT switch and the third contact of the second SPDT switch;

a first switch pin connected to the power source; and a second switch pin grounded via the coil, wherein in testing, the connector is electrically connected to an indicator connector of a host computer to be tested; upon the condition that a power switch of a host computer is closed, the second switch pin receives a high level signal, a current passes through the coil, the first contact and the second contact of the first SPDT switch are connected, the second power indicator pin receives a low level signal, the first contact and the second contact of the second SPDT switch are connected, the first power indicator pin receives a high level signal, a power indicator of the host computer emits a first indication light; and wherein upon the condition that the power switch is opened, the second switch pin receives a low level signal, no current passes through the coil, the first contact and the third contact of the first SPDT switch are connected, the first power indicator pin receives a low level signal, the first contact and the third contact of the second SPDT switch are connected, the second power indicator pin receives a high level signal, the power indicator emits a second indication light.

7. The testing apparatus of claim 6, further comprising a resistor, wherein the second power indicator pin is connected to the second contact of the first SPDT switch and the third contact of the second SPDT switch via the resistor.

8. The testing apparatus of claim 6, further comprising a ground clip, wherein the ground clip is grounded, and configured for clipping to the host computer.

9. The testing apparatus of claim 6, wherein the first indication light is different from the second indication light.

* * * * *